United States Patent [19]

Banerjee et al.

[11] Patent Number: 4,851,264

[45] Date of Patent: Jul. 25, 1989

[54] REINFORCEMENT OF REFRACTORIES BY PORE SATURATION WITH PARTICULATED FILLERS

[75] Inventors: Subrata Banerjee, Glen Ellyn; Neal T. Sullivan, Westchester, both of Ill.

[73] Assignee: Magneco/Metrel, Inc., Addison, Ill.

[21] Appl. No.: 939,061

[22] Filed: Dec. 8, 1986

[51] Int. Cl.$^4$ ............................................... B05D 3/02
[52] U.S. Cl. ................................. 427/294; 427/393.6; 264/102; 428/244; 428/283; 428/323; 428/408; 428/704
[58] Field of Search ............... 428/323, 408, 244, 283, 428/704; 427/294; 264/102

[56] References Cited

U.S. PATENT DOCUMENTS

| | | | |
|---|---|---|---|
| 4,311,661 | 1/1982 | Palmer | 264/102 X |
| 4,359,437 | 11/1982 | le Comte | 264/102 |
| 4,434,023 | 2/1984 | Kanamori et al. | 428/408 X |
| 4,517,137 | 5/1985 | Schön | 264/102 X |
| 4,535,035 | 8/1985 | Smialek et al. | 427/294 X |
| 4,581,284 | 4/1986 | Eggert et al. | 428/244 X |
| 4,655,700 | 4/1987 | Ahmed | 264/102 X |

FOREIGN PATENT DOCUMENTS

86/03165  6/1986  PCT Int'l Appl. ................. 428/408

Primary Examiner—George F. Lesmes
Assistant Examiner—M. A. Katz
Attorney, Agent, or Firm—Willian Brinks Olds Hofer Gilson & Lione Ltd.

[57] ABSTRACT

A process for reinforcing porous refractories with fillers, such as carbon particles, is provided. First, filler particles are mixed with a liquid resin to produce a liquid mixture. The mixture is allowed to seep into the pores of the refractory, preferably by immersing the refractory in said mixture in an evacuated tank. The refractory can be removed from the mixture and excess mixture can be allowed to drip from the refractory. The refractory is then cured, preferably by heating. The refractory is strengthened by the process to better withstand heat fluctuations encountered, for example, in the steel refining process.

28 Claims, 1 Drawing Sheet

REINFORCEMENT OF REFRACTORIES BY PORE SATURATION WITH PARTICULATED FILLERS

BACKGROUND OF THE INVENTION

This invention relates to refractories such as are used in the steel industry. More particularly, this invention relates to reinforcement of refractories by the impregnation of the pores of refractories with fillers to increase the resistance of the refractories to heat fluctuation. The impregnated refractories are useful, for example, in the steel industry.

Refractories such as aluminas and alumina silicate, silicas, mullites, zirconias, alumina carbons, magnesias and dolomites have high resistance to changes in temperature. Therefore, they can be used as thermal insulators, especially when the temperature changes are large. For example, they are used in gate assemblies in the steel industry, to control the flow of molten steel on an assembly line. Refractory-lined components more readily withstand the intermittent changes in temperature encountered on the assembly line due to heating and cooling of steel carriers.

One problem encountered with using refractories is that repeated temperature changes result in structural cracking of the refractories. For example, in the steel industry refractories wear out from continual changes in temperatures. Therefore, the prior art has recognized the need for reinforcement of refractories. The prior art method for strengthening refractories involves impregnation of fillers into the refractories to seal their pores. With such impregnation, the refractory develops a higher and more uniform structural strength to withstand heat fluctuations.

Carbon bearing materials, including coal tar, tar pitch and carbon pitch have been used by prior art as fillers for refractories. To impregnate refractories, these carbon bearing materials must be heated in order to sufficiently decrease their viscosity to allow them to seep into the pores of the refractory.

One problem encountered in heating carbon bearing materials for use as fillers in refractories is that noxious fumes are created. These fumes must be eliminated from the air because they can be harmful to the health of factory personnel. They may also violate OSHA or EPA standards. The need for elimination of the noxious fumes increases the cost of producing refractories reinforced with carbon bearing materials.

Furthermore, the prior art refractories bleed and smoke in use when volatiles contained in the carbon bearing materials are not entirely removed during baking after the impregnation process.

The present invention overcomes the above-identified problems inherent in the prior art processes for making reinforced refractories and in the use of refractories made by such prior art processes.

SUMMARY OF THE INVENTION

In accordance with the present invention, refractories are reinforced by introducing into their pores a liquid resinous mixture comprising particulated fillers. First, the filler particles are mixed with a resin to form a resinous mixture. The pores of a refractory are then saturated with the resinous mixture. Finally, the resinous mixture in the pores of the refractory is cured to produce the reinforced refractories of the present invention. The refractories produced in accordance with the present invention do not smoke or bleed when in use. Also, they are then more capable of withstanding wider heat fluctuations than refractories impregnated by prior art processes.

DETAILED DESCRIPTION OF THE PRESENT INVENTION

A. General Description

Figure 1:
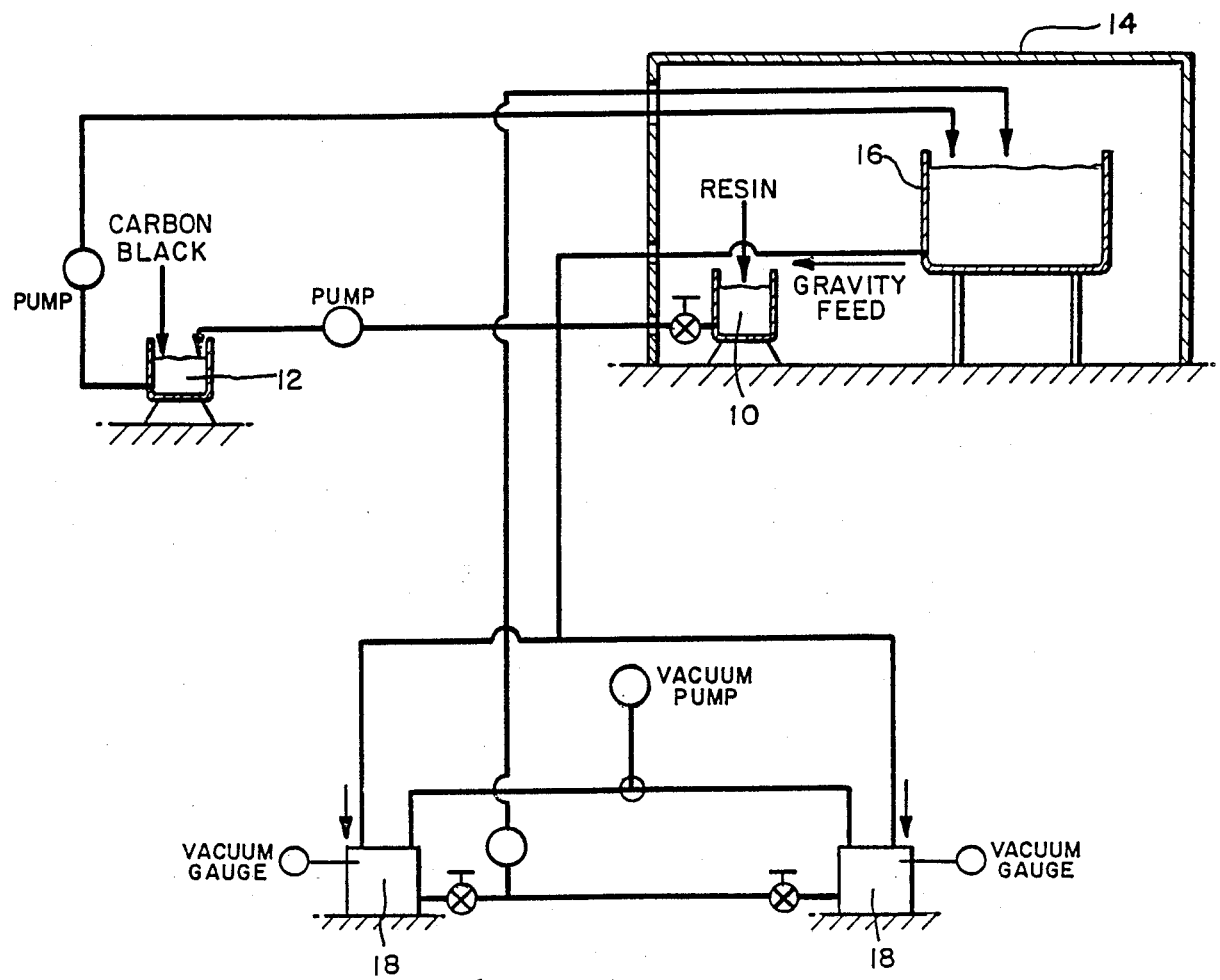
FIG. 1 is a flow chart of the steps used in the process of reinforcing refractories in accordance with the preferred embodiment of the present invention.

Surprisingly, it has been discovered that reinforced refractories having superior structural strength and resistance to temperature fluctuations can be produced by first introducing particulated fillers mixed in a liquid resin into the pores of a porous refractory and then curing the resin.

Introduction of a resinous mixture to saturate (substantially fill) the pores of a refractory permits the process to be performed over a wide range of temperatures. Essentially, the process is possible at temperatures above which the resin freezes and below which the resin self-polymerizes. Therefore, the process of introducing the resinous mixture into the refractories can generally be carried out at ambient temperatures. Saturation of refractory pores with particulated fillers, such as carbon particles, at ambient temperature has certain distinct advantages over the heating of carbon bearing materials to reduce their viscosity for use as impregnants. Specifically, carbon particles do not give off noxious fumes, nor do they create sediments on the refractory or in the heating chamber.

The use of particulated fillers, such as carbon, rather than carbon bearing elements employed by the prior art also causes a higher concentration of carbon in the refractory pores. This higher concentration enhances the structural strength of the refractory. Therefore, the resiliency to high temperatures is increased, allowing the refractory to withstand higher and more frequent heat fluctuations. In addition, using particles of carbon rather than carbon bearing materials eliminates the need to remove volatiles contained in the carbon bearing materials that can cause bleeding and smoking if heated while contained in the refractory.

The resins suitable for the use in the present invention are thermosetting resins, preferably phenolic resins. Generally, before any mixing with a particulated filler these resins possess a retained carbon content in the range of about 38% to about 40% of the total weight of the resin, and contain free phenol in the range of about 25% to about 30% of the resin. Additionally, before any mixing with a particulated filler, the solid resin component of these resins will be generally in the range of about 60% to about 70% of the total resin weight. Presently, the most preferred resin is phenol formaldehyde, such as Georgia Pacific Corporation's phenol formaldehyde, number 5001, and Borden Chemical's phenol formaldehyde, number 2360 and number 2395.

The viscosity of the resin must be low enough to permit the resin to flow into the pores of the refractory when it is applied to the refractory. Generally suitable resins possess viscosities in the range of about 100 to about 500 centipoise at operating conditions. Preferably, the viscosity of the resin is in the range of about 150 to about 390 centipoise at operating conditions, which will usually be in the range of 65° F. and 75° F.

The particulated filler useful in connection with the present invetion can be any material which does not decompose at high temperatures (up to 3350° F.) and has a particle size large enough to help saturate the refractory pores but small enough to allow entry thereof into the pores. For most refractories, particulated fillers having diameters in the range of about 10 nm to about 100 nm are suitable in connection with this invention. The preferred particulated fillers are carbonaceous materials, such as, carbon black, lamp black or furnace black, which are useful for their nonwetting properties. Preferably, the particulated fillers have diameters in the range of about 30 nm to about 50 nm. Best results were obtained using nongranulated carbon black having diameters in the preferred range, purchased from Phillips Petroleum Corporation.

The amount of particulated filler added to the resin should be enough to saturate the pores of the refractory so that the refractory will become more strongly reinforced when the resinous mixture thermosets inside the refractory pores, yet not so much as to prevent the resin from flowing into the pores throughout the refractory. Generally, the weight percentage of particulated material added to the resin is in the range of about 1% to about 5% of the total weight of the resinous mixture. Preferably, the weight percentage of particulated filler added to the resin is in the range of about 1% to about 2% of the total weight of the resinous mixture.

Mixing of the particulated filler and the resin is generally carried out at ambient temperatures. The temperature at which mixing takes place should be low enough so that the resin will not self-polymerize but high enough so that the resin will mix with the particulated filler, which is usually carbon. Generally, the mixing temperatures are kept in the range of about 60° F. to about 85° F. Preferably, the temperatures are maintained in the range of about 65° F. and about 75° F.

The saturation of the pores of the refractories takes place at pressures where the resinous mixture will enter the pores of the refractory. Generally, saturation takes place at pressures lower than atmospheric pressure. Preferably saturation takes place in a chamber, evacuated in order that the refractory pores will be filled effectively. The chamber is maintained at a negative pressure in the range of about 27 to about 29 inches of mercury.

Under the preferred method, the chamber is evacuated with the refractory inside, so that the air in the refractory pores is removed. While the chamber is still under vacuum, the resinous mixture is introduced into the chamber. The mixture then saturates the pores of the refractory due to the capillary effect exerted on the refractory by the mixture in the evacuated chamber. In this fashion saturation is generally accomplished after a period of time in the range of about 60 minutes to about 120 minutes.

For purposes of manufacturing and quality control only, after saturation of the pores of the refractory the excess resinous mixture is usually allowed to drip from the refractory. This allows for a smoother surface on the refractory, and therefore enables easier handling of the refractory surface and permits the creation of closer tolerances on the refractory surfaces. The refractory is usually allowed to drip for about 90 minutes.

After the refractory is allowed to drip, the resinous mixture is then cured. The resinous mixture is caused to thermoset, so that it will not become liquid during subsequent heating and cooling during use of the refractory. Curing generally takes place for a time long enough for the resin to become polymerized to form a solid resin. Generally, the resinous mixture in the pores of the refractory is cured in a heating chamber at temperatures in the range of about 200° F. to about 400° F., for a time period in the range of about 6 to about 12 hours. Preferably, curing takes place in an oven where the refractory saturated with the resinous mixture is baked, with the heating rate controlled not to exceed about 50° F./hr up to about 200° F. and held at about 200° F. for a period of about 2 hours. Then, the temperature is raised to about 400° F. at about 100° F./hr and held at about 400° F. for at least about 2 hours.

The refractory with saturated pores is then available for use to withstand high temperature fluctuations. The refractory containing the thermoset resinous mixture is usually allowed to cool to ambient temperatures, for shipping and handling purposes.

DESCRIPTION OF THE PREFERRED EMBODIMENT

The invention will now be described in connection with the preferred embodiment as depicted in the drawings. Referring now to FIG. 1, phenol formaldehyde is placed in a tank 10 in a room 14 maintained at controlled temperatures between 65° F. and 75° F. The phenol formaldehyde is pumped into mixer 12, and then carbon particles of non-granulated carbon black, lamp black, or furnace black having a diameter between about 10 nm and about 50 nm are added into the mixer 12 to achieve the desired carbon/resin combination so that the carbon added to the phenol formaldehyde is in the range of about 1% to about 5% of the weight of the carbon/resin combination. The mixer 12 then agitates the carbon/resin combination to achieve the resinous mixture to be used to saturate the pores of the refractories.

The resinous mixture is then pumped to an elevated tank 16 in the room 14 maintained at controlled temperatures. Refractories to be impregnated are placed inside a wire basket (not shown). The basket is then placed with the refractories in an evacuating tank 18. The vacuum in the tank 18 is activated to remove air pockets from the pores of the refractory and allow for easier flow of the carbonated resin into the refractory. Best results are achieved where the vacuum is between about 27 and about 29 inches of mercury. The resinous mixture is allowed to flow from the holding tank 16 into the vacuum tank 18 by gravity until the refractories are generally entirely covered by the resinous mixture.

The resinous mixture seeps into the empty pores of the refractory, filling these pores with the resinous mixture. The refractory is maintained under vacuum in the tank 18 immersed in the resinous mixture, until the refractory pores are generally saturated with the resinous mixture, a condition which is generally achieved when the refractory is immersed for a period of about 60 minutes to about 120 minutes.

After saturation of the pores of the refractory with the resinous mixture, the refractory is removed from the vacuum tank 18 and placed above the tank so that excess resin is allowed to drip into the impregnating tank for about 90 minutes, or until the resinous mixture has effectively dripped from the refractory. The resinous mixture remaining in the evacuating tank 18 is then pumped back to the holding tank 16.

The refractory is then placed in an oven for curing. The heating rate is controlled not to exceed about 50° F./hr up to about 200° F. and held at about 200° F. for a period of about 2 hours. Then, the temperature is raised to about 400° F. at about 100° F./hr and held at about 400° F. for at least about 2 hours. At that point, the resinous mixture in the refractory has self-polymerized, so that it has become thermoset.

The refractory is then taken from the oven and cooled to ambient temperatures. The impregnated refractory becomes available for use to withstand high temperature fluctuations, such as those encountered in the steel industry.

The following examples are provided solely for the purposes of illustration and are not intended to limit the scope of the invention in any manner.

EXAMPLE I

Comparative tests between resinous mixture saturated refractories and the more typical carbon bearing material impregnated refractories were performed. In this example, the carbon bearing material used to impregnate the refractories in accordance with a prior art approach was a coal tar. It was compared to refractories made in accordance with this invention where the resin used was phenol formaldehyde, no. 2360, purchased from Borden Chemical. The carbon used was nongranulated carbon black, having a diameter in the range of about 30 nm to about 50 nm, purchased from Phillips Petroleum Corp. The mixture had a viscosity of about 150 to about 170 centipoise at 65° F. to 75° F. The mixture contained about 1% carbon added by weight.

The resin was poured from a holding tank into a fan blade mixer. The carbon black was then added to the mixer and mixed with the resin. After the resin and carbon black were mixed, the refractory was placed in a wire basket and then the wire basket along with the refractory was placed in an evacuating tank. The tank was then evacuated to between about 27 and about 29 inches of mercury. With the vacuum intact, the resinous mixture was then introduced into the tank, until it entirely covered the refractory, allowing capillary effect and hydraulic pressure of the liquid resinous mixture to suck the resinous mixture into the refractory.

The refractory was immersed in the resinous mixture for about 90 minutes. The seal was then broken on the tank, and the basket containing the refractory was allowed to drip the excess resin over the evacuating tank.

After being allowed to drip for about 2 hours, the refractory was taken from the basket and placed in an oven to cure. The oven was maintained at a heating rate of 50° F./hr for about 3 hours, from ambient temperature up to about 200° F. It was then held at 200° F. for about 2 hours, then raised at 100° F./hr for about 2 hours, then held at 400° F. for about 2 hours. At this point the resinous mixture had completely self-polymerized. The refractory was taken from the oven and placed in a well-ventilated area where it was then allowed to cool until it reached equilibrium of ambient temperature.

The resulting properties of this refractory which had been saturated with a resinous mixture were compared to a typical refractory formed with a coal tar impregnant. This coal tar impregnated refractory was formed by immersing a refractory for about 90 minutes in a tank which had been evacuated to about 27 to about 29 inches of mercury and then filled with heated coal tar. The refractories were then air dried for about 4 to about 6 hours, then baked at about 600° F. for about 3 hours and allowed to cool to ambient temperature.

The following comparative results were obtained:

| | Unsaturated | Coal Tar Impregnated (Prior Art) | Carbon Resinous Mixture Saturated (Present Invention) |
|---|---|---|---|
| Cold Modulus of Rupture, PSI | 4,500 | 5,800 | 7,740 |
| Improvement over Unsaturated, % | — | 28.8 | 72.0 |
| Cold Crushing Strength, PSI | 10,424 | 14,667 | 18,728 |
| Improvement over Unsaturated, % | — | 40.7 | 79.7 |

As can be seen, the refractories formed in the present invention had a cold modulus of rupture 33.4% greater than those formed in accordance with the prior art. These refractories also had a cold crushing strength 27.7% higher than those formed in accordance with the prior art.

EXAMPLE II

In this example, the carbon bearing material used to impregnate the refractories in accordance with a prior art approach was a coal tar. The resin used to reinforce the refractories in accordance with the present invention was phenol formaldehyde no. 2395, purchased from Borden Chemical. The carbon used was nongranulated carbon black having a diameter of about 30 nm to about 50 nm, purchased from Phillips Petroleum Corporation. The mixture had a viscosity of about 380 to about 390 centipoise. The mixture contained about 2% carbon by weight.

The resin was poured from a holding tank into a fan blade mixer. The carbon black was then added to the mixer and mixed with the resin. After the resin and carbon black were mixed, the refractory was placed in a wire basket and then the wire basket along with the refractory was placed in an evacuating tank. The tank was then evacuated to between about 27 and about 29 inches of water. With the vacuum intact, the resinous mixture was then introduced into the tank, until it entirely covered the refractory, allowing capillary effect to suck the resinous mixture into the refractory.

The refractory was immersed in the resinous mixture for about 90 minutes. The seal was then broken on the tank, and the basket containing the refractory was allowed to drip the excess resin over the evacuating tank.

After being allowed to drip for about 2 hours, the refractory was taken from the basket and placed in an oven to cure. The oven was maintained at a heating rate of 50° F./hr for about 3 hours, from ambient temperature up to about 200° F. It was then held at 200° F. for about 2 hours, then raised at 100° F./hr for about 2 hours, then held at 400° F. for about 2 hours. At this point the resinous mixture had completely self-polymerized. The refractory was taken from the oven and placed in a well-ventilated area where it was then allowed to cool until it reached equilibrium of ambient temperature.

The resulting properties of this refractory which had been saturated with a resinous mixture were compared to a typical refractory formed with a coal tar impregnant. This coal tar impregnated refractory was formed by immersing a refractory for about 90 minutes in a tank which had been evacuated to about 27 to about 29 inches of water and then filled with heated coal tar. The refractories were then air dried for about 4 to about 6 hours, then baked at about 600° F. for about 3 hours and allowed to cool to ambient temperature.

The following comparative results were obtained:

|  | Un-saturated | Coal Tar Impregnated (Prior Art) | Carbon Resinous Mixture Saturated (Present Invention) |
|---|---|---|---|
| Cold Modulus of Rupture, PSI | 4,500 | 5,880 | 7,740 |
| Improvement over unsaturated | — | 28.8 | 72.0 |
| Cold Crushing Strength, PSI | 10,424 | 14,667 | 18,998 |
| Improvement over unsaturated, % | — | 40.7 | 82.2 |

As can be seen, the refractories formed in accordance with the present invention had a cold modulus of rupture 33.4% greater than those formed in accordance with the prior art. These refractories also had a cold crushing strength 29.5% higher than those formed in accordance with the prior art.

The results of these tests demonstrate that by saturating the pores of a refractory with fine particles of carbon in a resinous mixture, the strength of the refractory increases over the strength of the refractories which use the prior art impregnation process.

Various changes and modifications will occur to those skilled in the art upon studying this disclosure. All such changes and modifications that fall within the spirit of this invention are intended to be within its scope.

What is claimed is:

1. A process for reinforcing a porous refractory of the type used in the steel industry, said process comprising:
   introducing a liquid resinous mixture comprising a particulated filler material in a thermosetting resin, into the pores of a refractory; and
   curing the mixture in the pores of the refractory in the presence of heat to produce a reinforced refractory;
   said particulated filler material comprising at least one particulated carbonaceous material which does not decompose at temperatures of up to about 3,350° F.

2. The process of claim 1 further comprising the step of mixing particulated fillers with a liquid thermosetting resin to produce said liquid resinous mixture.

3. The process of claim 1, wherein the thermosetting resin comprises a phenolic resin.

4. The process of claim 1 wherein the thermosetting resin comprises phenol formaldehyde.

5. The process of claim 1, wherein the particulated carbonaceous materials comprise carbon particles.

6. The process of claim 1 wherein the particulated carbonaceous materials are selected from a group consisting of carbon black, furnace black and lamp black particles.

7. The process of claim 1 wherein the liquid resinous mixture in the refractory is cured by heating said mixture to a temperature of at least about 200° F.

8. The process of claim 7 wherein the liquid resinous mixture in the refractory is cured by baking.

9. The process of claim 1 wherein the step of introducing comprises saturating the pores of the refractory with the liquid resinous mixture.

10. The process of claim 1 wherein the step of introducing comprises:
    evacuating the pores of the refractory to create a condition of reduced pressure; and
    immersing the refractory under reduced pressure into the liquid resinous mixture for a time period sufficiently long to allow the liquid resinous mixture to flow into the pores of the refractory.

11. The process of claim 10 further comprising the steps of removing the submersed refractory from the liquid resinous mixture and allowing the excess liquid resinous mixture to drip from the refractory.

12. A process for reinforcing a porous refractory of the type used in the steel industry, said process comprising the steps of:
    mixing carbon particles with a liquid phenol resin to produce a liquid resinous mixture;
    pumping the liquid resinous mixture into a holding tank;
    allowing the liquid resinous mixture to flow by gravity force into a tank containing at least one porous refractory, said tank being maintained at sufficiently low pressure to evacuate the pores of the refractory;
    maintaining the refractory in said tank until said resinous mixture saturates the pores of the refractory;
    allowing the excess resinous mixture to drip from the saturated refractories; and
    curing the resinous mixture in the refractory through baking;
    said carbon particles being resistant to decomposition at temperatures below 3350° F.

13. The process of claim 12 wherein the step of mixing comprises using a fan blade type mixer.

14. The process of claim 12 wherein the pressure in said tank is in the range from about 27 to about 29 iches of mercury below atmospheric pressure.

15. The process of claim 12 wherein the refractory is maintained in said tank for a time period in the range from about 60 to about 120 minutes.

16. The process of claim 12, wherein the refractory is baked for a time period in the range of about 6 to about 12 hours.

17. The process of claim 16 wherein baking is carried out at a temperature in the range of about 200° F. to about 400° F.

18. The process of claim 12, wherein the refractory is baked by raising the temperature from ambient temperature at the rate of about 50° F./hr to about 200° F., then maintaining the temperature at about 200° F. for about 2 hours, then raising the temperature at the rate of about 100° F./hr for about 2 hours, then maintaining the temperature at about 400° F. for at least about 2 hours.

19. The process of claim 12 wherein said liquid phenolic resin comprises a phenol formaldehyde with about 25% to about 30% free phenol by weight.

20. The process of claim 12 wherein said phenolic resin comprises a phenol formaldehyde resin with viscosity in the range of about 100 to about 500 centipoise under operating conditions.

21. The process of claim 12 wherein said phenolic resin comprises a phenol formaldehyde resin with viscosity in the range of about 150 to about 390 centipoise when measured at temperatures in the range of about 65° F. to about 75° F.

22. The process of claim 12 wherein mixing is carried out at temperatures in the range of about 65° F. and about 75° F.

23. The process of claim 12 wherein said carbon particles are selected from a group consisting of carbon black, furnace black and lamp black.

24. The process of claim 12 wherein said mixing step comprises mixing of phenol formaldyhde resin with carbon particles ranging in size from about 10 nm to about 100 nm.

25. The process of claim 12, wherein said mixing step comprises mixing phenol formaldehyde with carbon particles ranging in size from about 10 nm to about 50 nm.

26. The process of claim 12, wherein the carbon particles mixed with phenol formaldehyde range in size from about 30 nm to about 50 nm.

27. The process of claim 12 wherein the residual carbon content of the phenol formaldehyde resin is between about 38% and about 40% carbon of the total weight of the resin.

28. A process for reinforcing refractories, said process comprising:

mixing carbon particles, selected from a group consisting of lamp black, carbon black and furnace black and having a diameter of about 30 nm to about 50 nm, with phenol formaldehyde having a retained carbon content about 38% and about 40% by weight and free phenol between about 25% and about 30% by weight and having a viscosity of about 150 to about 390 centipoise when measured at temperatures of about 65° F. to about 75° F., said mixing accomplished in a fan blade mixer to produce a resinous mixture, said mixture containing about 1% to about 2% carbon by weight;

pumping said resinous mixture into a holding tank;

causing the resinous mixture to flow into an evacuating talk containing at least one porous refractory by gravity flow evacuated in the range of about 27 to about 29 inches mercury, so that saturation of the pores of the refractories will take place, said saturation accomplished at temperatures between about 65° F. and 70° F. for a period from about 60 minutes to about 120 minutes;

dripping the excess resin from the saturated refractories for a period from about 90 minutes at ambient temperature;

curing the refractories by heating said refractory in an oven by heating the refractories raising the heating rate from ambient temperature by 50° F./hr to about 200° F., holding the oven at about 200° F. for about 2 hours, raising the temperature about 100° F./hr for about 2 hours, and holding the oven at about 400° F. for about 2 hours; and allowing the refractories to thermoset by removing the refractories from the oven and allowing the refractories to cool to ambient temperature.

* * * * *

UNITED STATES PATENT AND TRADEMARK OFFICE
CERTIFICATE OF CORRECTION

PATENT NO. : 4,851,264
DATED : July 25, 1989
INVENTOR(S) : SUBRATA BANERJEE et al.

It is certified that error appears in the above-identified patent and that said Letters Patent is hereby corrected as shown below:

In column 3, line 2, please delete "invetion" and substitute therefor --invention--.

In column 5, line 25, please delete "nongranulated" and substitute therefor --non-granulated--.

IN THE CLAIMS

In column 7, line 53, before "wherein" please insert --,--.

In column 7, line 57, before "wherein" please insert --,--.

In column 7, line 61, before "wherein" please insert --,--.

In column 7, line 64, before "wherein" please insert --,--.

In column 7, line 66, before "wherein" please insert --,--.

UNITED STATES PATENT AND TRADEMARK OFFICE
CERTIFICATE OF CORRECTION

PATENT NO. : 4,851,264

DATED : July 25, 1989

INVENTOR(S) : SUBRATA BANERJEE et al.

It is certified that error appears in the above-identified patent and that said Letters Patent is hereby corrected as shown below:

In column 8, line 1, before "wherein" please insert --,--.

In column 8, line 33, before "wherein" please insert --,--.

In column 8, line 35, before "wherein" please insert --,--.

In column 8, line 36, please delete "iches" and substitute therefor --inches--.

In column 8, line 38, before "wherein" please insert --,--.

In column 8, line 44, before "wherein" please insert --,--.

In column 8, line 54, before "wherein" please insert --,--.

In column 8, line 57, before "wherein" please insert --,--.

In column 8, line 61, before "wherein" please insert --,--.

In column 8, line 66, before "wherein" please insert --,--.

UNITED STATES PATENT AND TRADEMARK OFFICE
CERTIFICATE OF CORRECTION

PATENT NO. : 4,851,264
DATED : July 25, 1989
INVENTOR(S) : SUBRATA BANERJEE et al.

Page 3 of 3

It is certified that error appears in the above-identified patent and that said Letters Patent is hereby corrected as shown below:

In column 9, line 1, before "wherein" please insert --,--.

In column 9, line 4, before "wherein" please insert --,--.

In column 9, line 15, before "wherein" please insert --,--.

In column 10, line 7, please delete "talk" and substitute therefor --tank--.

Signed and Sealed this

Thirty-first Day of December, 1991

Attest:

HARRY F. MANBECK, JR.

*Attesting Officer*  *Commissioner of Patents and Trademarks*